INVENTORS
HANS BARUCH
ERIK W. ANTHON

Schapp & Hatch
ATTORNEYS

United States Patent Office 3,364,811
Patented Jan. 23, 1968

3,364,811
AUTOMATED SPECTROPHOTOMETRIC
SYSTEM
Hans Baruch, Berkeley, and Erik W. Anthon, Kensington, Calif., assignors, by mesne assignments, to Warner-Lambert Pharmaceutical Company, Morris Plains, N.J.
Filed Dec. 27, 1962, Ser. No. 247,622
6 Claims. (Cl. 88—14)

The present invention relates to an automated spectrophotometric system and particularly to an automated spectrophotometric system capable of measuring an optical property in a sample indicative of an analytical result.

Spectrophotometers and colorimeters are well known, and it is also known to use such instruments for measuring an optical property as a part of an analytical procedure. However, these instruments are generally operated manually, and provide measurements which must be interpreted by the operator in order to obtain the quantitative value of the analysis desired. Accordingly, the known instruments are not suitable for use in automatic processes.

Recently, considerable effort has been expended in the direction of automating analytical procedures and in providing apparatus capable of automatically carrying out certain standard procedures. To this end, certain procedures have been automated by providing equipment capable of adding reagents to the sample, incubating a reaction mixture for a period of time in fixed temperature, centrifuging or filtering sample, measuring the pH of the sample, and other such procedures. In addition, certain pieces of analytical equipment have combined the various pieces of apparatus to provide an analytical system and certain of these applications are the subject of a number of copending applications of the present individual inventors either as a sole inventor or as a coinventor.

Automated analytical systems of this type are manufactured by Research Specialities Co. of Richmond, Calif., under the trademark "Robot Chemist." Prior to this invention, the conventional colorimeters or spectrophotometers have not had the combination of qualities required for use in the Robot Chemist systems. In particular, the conventional equipment does not provide means for automatically positioning the sample in a spectrophotometer or measuring and recording the analytical results obtained by the signals measured in the spectrophotometer.

Accordingly, it is the primary object of this invention to provide a spectrophotometer or colorimeter which is completely automatic in its operation and capable of being incorporated in an automatic analytical apparatus as controlled by an external timer or programmer.

Another object of the invention is to provide a spectrophotometer or colorimeter capable of functioning as a component of an automated spectrophotometric system including a potentiometric recording system, which is especially constructed to provide readings directly in optical density units or in terms of the analytical measurement required, and which is designed so that it can be combined with a Robot Chemist and have its signal used with conventional recorders.

A further object of the invention is to provide an apparatus of the character described, which is capable of withstanding the corrosive fumes normally present in chemical laboratories, and which is capable of working with small samples such as samples of one milliliter or less.

A still further object of the invention is to provide a spectrophotometer for use in the system described which is capable of operating through a large range of wave lengths at a comparatively narrow band width.

Another object of the invention is to provide a system of the character described having a spectophotometer or colorimeter which works accurately over the whole range of optical densities.

Still another object of the invention is to provide an apparatus of the character described which is stable so that changes in line voltage, mean temperatures, or changes caused by aging of components such as lamps do not seriously affect the accuracy of the instrument.

Yet another object of the invention is to provide an apparatus of the character described which is easily serviceable so that regular maintenance may be performed with a minimum of delay, and in which calibration is either completely automatic or in which one daily calibration is sufficient.

Further objects and advantages of my invention will be apparent as the specification progresses, and the new and useful features of our automated spectrophotometric system will be fully defined in the claims attached hereto.

Briefly speaking, the invention provides an automated spectrophotometric system for use in automated analytical procedures, and consists basically of a spectrophotometer having a sample container capable of receiving sample from a Robot Chemist system in which the sample is treated to develop the necessary color or other optical property for measurement in the spectrophotometer, an electrical circuit associated with the spectrophotometer for automatically handling the signal indicative of the property of the sample being measured, and means in the circuit for translating the signal to a measurable quantity in terms of optical density. It is also within the ambit of the invention to translate the optical density into the actual value of the constituent being measured, and in some cases a recorder for automatically recording such measurement is also provided.

In accordance with the invention, a colorimeter which emits a pulse signal is utilized in combination with a special circuit which requires a pulse signal input. In order to provide accurate results, the spectrophotometer measures the sample against a reference or blank sample and the circuitry is designed to drive a recorder or other indicating device to a null balance or other indicating position with the indicating device being calibrated to measure the difference in optical density between the treated sample and the reference sample.

The invention also provides means for automatically moving sample into and out of a sample tube or cuvette in the spectrophotometer, and said means is suitable for combination with other modules of analytical apparatus. Preferably, the means for moving sample is that utilized in the copending United States patent application of Hans Baruch and Erik W. Anthon, the inventors of the present application, filed Oct. 4, 1962, Ser. No. 228,337, now Patent No. 3,225,645, entitled, Cuvette and Supply System Therefor, and assigned to the assignee of the present invention.

Although the apparatus has been referred to as a spectrophotometer or colorimeter, it may be either type of instrument and the preferred form includes some of the characteristics of both instruments. For example, the instrument is capable of operating through a large range of wave lengths including the entire principal spectrum and in this respect is similar to a spectrophotometer. On the other hand, in its preferred form, the apparatus is adjusted to operate at a selected band of the spectrum and therefore is similar to a colorimeter. However, it will be appreciated that various optical measurements may be made within the scope of the present invention by the instrument described herein.

In the apparatus of the present invention, the light intensity of a fixed wave length or narrow wave length band which is passed through the sample is measured electrically in a photosensing device such as a photoelectric cell. Another measurement is taken of the light intensity of light of the same wave lengths which is passed through a reference sample and measured in a reference light-sensing device. The apparatus is calibrated so that the measurements made by the test photosensing device and reference photosensing device are balanced when both samples are alike. In this way, the light intensity of the sample due to a constituent therein to be measured is indicated in the apparatus by the ratio of light intensity as measured by the photosensing devices.

These signals are then utilized through appropriate electric circuits to provide a mechanical position that can be read directly or used to obtain a printed result, if desired. In other words, the electric circuits including the photosensing devices are coupled with means in the circuit for translating the light signals to a measurable quantity in terms of optical density. In this way, the optical density of a sample at a fixed wave length is measured and an analytical result is obtained where the optical density is measured as a function of the concentration of the constituent measured. If desired, the recorder can provide the answer directly in terms of the concentration of the unknown constituent measured for certain procedures by programming the apparatus to do so.

Various ways of measuring the optical density desired from the signals in the photosensing elements may be utilized. In one method, the signals from the photosensing element are amplified and used to drive servomotors which in turn position a printout mechanism according to the signal received. Another method is to utilize a circuit having a potentiometer therein in which the signal from each of the two photosensing elements is balanced to a null point through the potentiometer and the position of the potentiometer is used for readout of the answer or for positioning the printing mechanism.

Still another method is to utilize an opitcally variable tape in the reference measurement with the tape adjusted to provide a balance of signals. This may be conveniently achieved by providing a mechanism for driving the tape with a servomotor operating by a signal from a difference amplifier or the like receiving the signals. The tape may then be read directly or may be combined with other means for printing answers.

Various other mechanisms are usually incorporated in the system such as a means for calibrating the apparatus as mentioned above, and a gain control to protect the photosensing devices when the machine is to handle intensities varying over a great range.

For the sake of illustration, the preferred forms of our invention are illustrated in the accompanying drawings forming a part of this specification, in which.

While we have shown only the preferred forms of our inventon, it should be understood that various changes or modifications may be made within the scope of the claims attached hereto without departing from the spirit of the invention.

Figure 1:
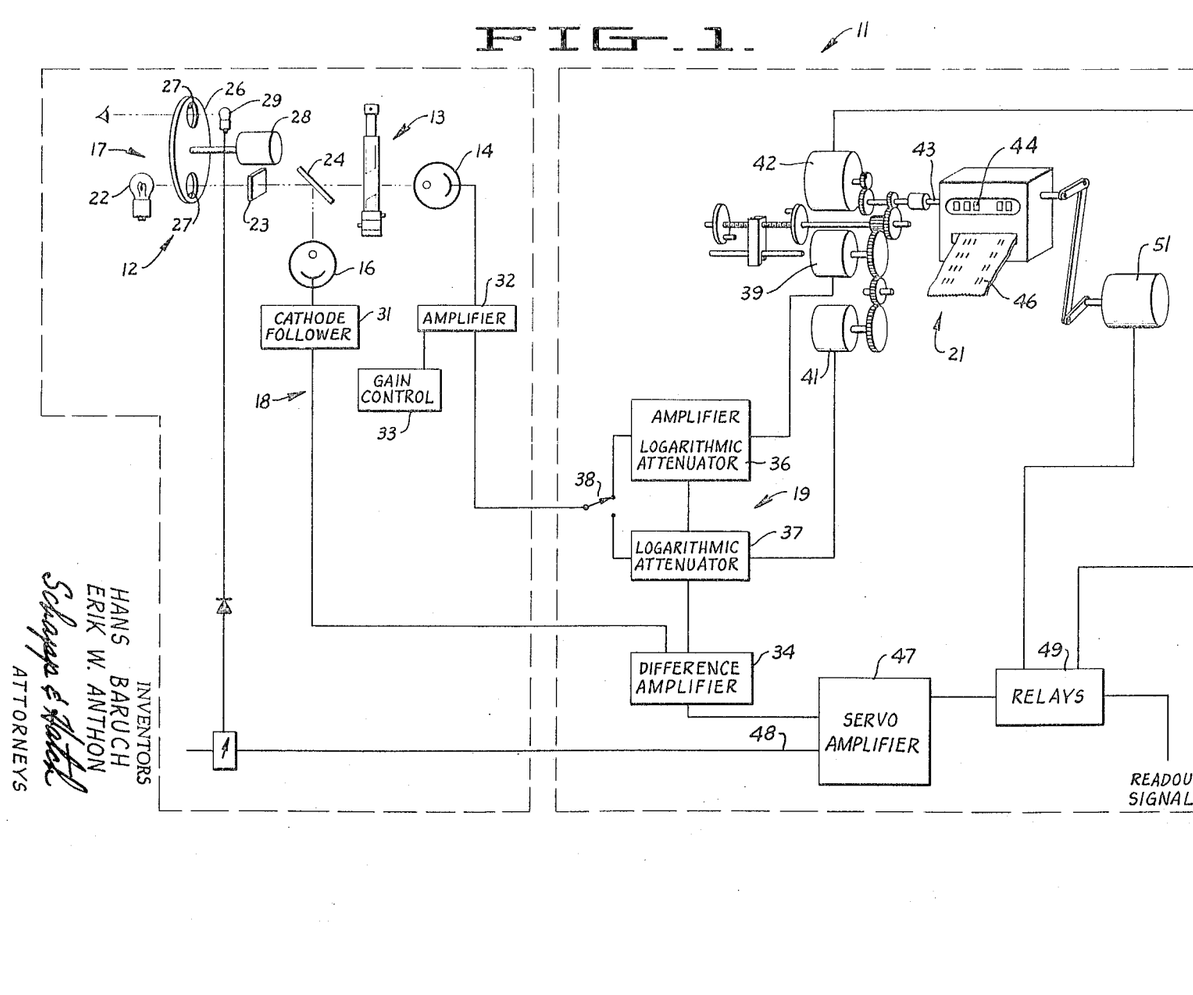
FIGURE 1 is a schematic view of one embodiment of the invention illustrating the manner in which various components of the invention cooperate with each other.

Referring to the drawing in greater detail and to FIGURE 1 in particular, there is shown an automated spectrophotometric system 11 capable of measuring an optical property in the samples indicative of an analytical result, comprising a spectrophotometric apparatus 12 having a sample container or cuvette 13, a photosensing device such as photoelectric cell 14 for measuring the intensity of a controlled light beam which is passed through the sample in container 13, a reference photosensing device such as photoelectric cell 16, means 17 for providing a controlled light beam or the like to the test photoelectric cell and reference photoelectric cell, an electrical circuit 18 associated with the photoelectric cells 14 and 16 for automatically handling the signals taken therefrom indicative of the property of the sample being measured, and means 19 in the circuit for translating the signals to a measurable quantity in terms of optical density.

Preferably, the measured quantity will be recorded by a suitably recording means such as the recording device 21 although it will be appreciated that other means for obtaining and recording this measured quantity may be utilized, if desired.

The spectrophotometric apparatus 12 contains an optical system comprising a light source 22, a monochromator 23, a beam splitter 24 and a beam modulator 17 mentioned above. In general, these components may be provided by utilizing any materials now used in the art for providing the desired functions. However, certain specific components are preferred to give the desired accuracy in the system.

The light source 22 is preferably an exciter lamp of the type used in movie sound projectors. A typical lamp is rated at about 30 watts and has a tightly wound spiral filament which acts as the entrance slit for the monochromator. The lamp comes with an accurately located filament and prefocused base, however replacement of the lamp may require adjustment of the lamp position. This may be accomplished by a visual alignment of the filament or any other method of checking the accuracy of the filament location.

The tungsten filament provides a concentrated source of light of well-defined shape and is suitable for proper operation of the monochromator. For example, the lamp will supply sufficient output to 950 m$\mu$. The life of the lamp is short when operated at the rated voltage, and it is therefore desirable to provide a system whereby the useful life of the lamp is lengthened. One of these methods involves reducing the voltage of the lamp by 25% when the lamp is to be used with wave lengths above 400 m$\mu$. This increases the life of the lamp thirtyfold or more. The lamp is also turned off or turned to low voltage when actual measurement is not being made and this also improves the length of the lamp life.

Keeping a reduced voltage on the lamp at all times lessens the surge of light normally present when the lamp is turned on cold. Although the lamp is not able to completely stabilize when it is turned on, the dual beam system utilized in the preferred form of the invention will compensate for any drift.

As indicated above, the monochromator may employ any suitable method for providing monochromatic light within the desired wave length ranges. In other words, the monochromator will provide light in a narrow band width. Accordingly, either of the two basically different methods of obtaining such restricted wave lengths may be used. For example, the monochromator 23 shown in FIGURE 1 is a filter system using interference filters, and the preferred embodiment illustrated in FIGURES 7 and 8 utilizes a dispersing system; specifically, a diffraction grating. Alternatively, the dispersing system could utilize prisms.

The dispersing system is preferred over the filter system because the dispersing type monochromator is the most flexible device, and, in the unit required, a large assortment of filters would be needed. In other words, the monochromator should provide any of a large number of positions on the spectrum including the invisible portion thereof. The actual band width of the monochromatic light is not critical and need not be adjustable because the same light is utilized in both tests by virtue of the beam splitter. However, a band width of from say 15 to 20 mμ is obtained with the grating and is quite satisfactory in operation.

Figure 7:
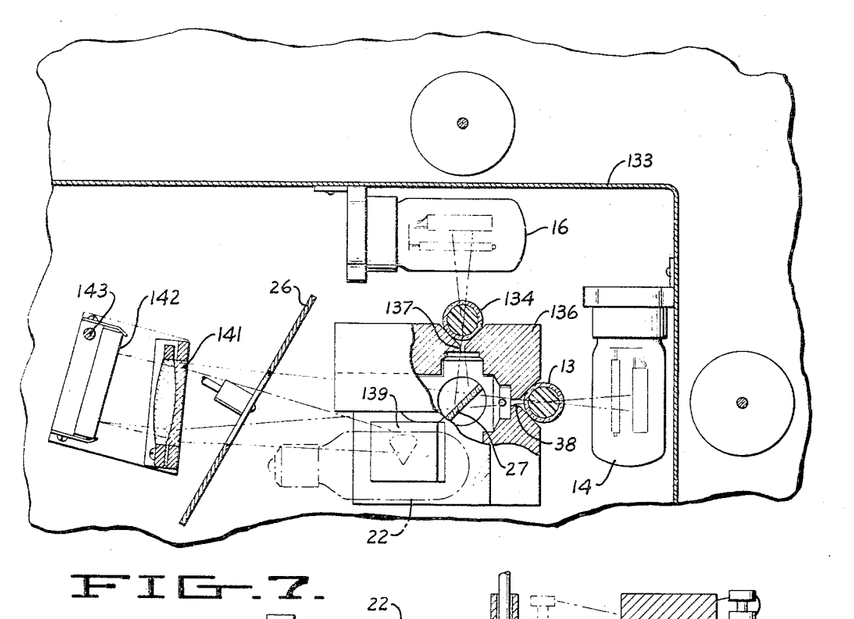
FIGURE 7, a fragmentary plan view as seen in the plane of line 7—7 of FIGURE 8 illustrating the optical system utilized in the preferred form of the invention.
Figure 8:
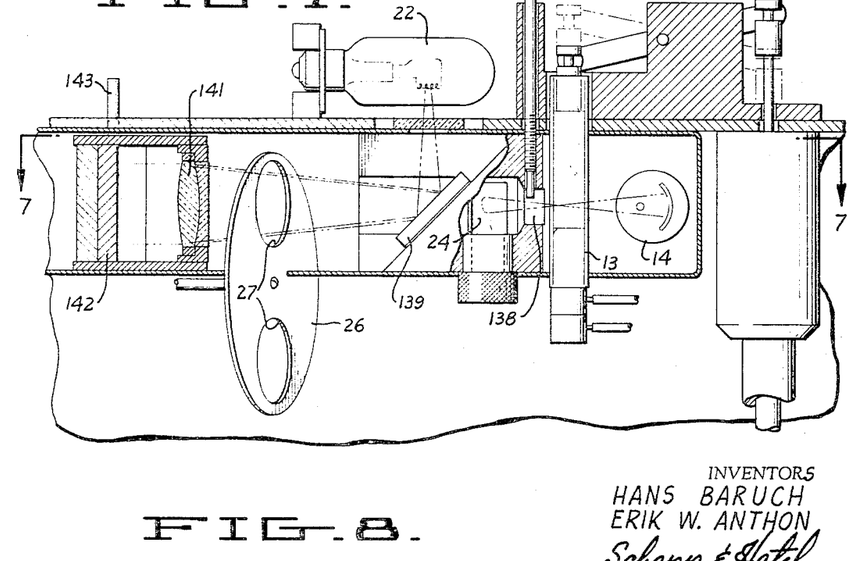
FIGURE 8, a fragmentary elevational view of the optical system shown in FIGURE 7.

The means 17 for modulating the light may be a chopper disc 26 as shown in FIGURE 1 having openings 27 therein through which the light passes when the openings are in alignment. The chopper disc is driven at a constant fixed speed by a synchronous motor 28 so that alternate periods of light and no light are presented through the system to the light-sensing elements. Preferably, the chopper disc will be located near the monochromator or the diffraction grating as best shown in FIGURES 7 and 8 to minimize the amount of stray light that may pass through the system. In the system shown in FIGURE 1, a stroboscopic light 29 is provided to check the frequency of the chopper disc by visual alignment. However, other systems may be utilized to provide a sufficiently accurate operation of the chopper disc.

As indicated above, an important feature of the present invention resides in the dual system in which the sample is measured against a blank or test sample using the same monochromatic light beam in each case. Light beams of similar characteristics are obtained by utilizing a beam splitter 24 which directs a fraction of the light through the reference sample to the photoelectric cell 16 while the remaining fraction of the light is directed through the test sample to the photoelectric cell 14.

Excellent results are obtained by utilizing an exceedingly thin sheet of glass for the beam splitter and placing the sheet of glass at an angle with respect to the modulated monochromatic light from the light source so that part of the light passes through the glass to provide one fraction while the remainder of the light is reflected from the surfaces of the glass to provide the other fraction. It is important to utilize thin sheets of glass because light is reflected from both the front and rear surfaces of the glass sheet. In such a case, no problem is caused by the double reflection.

The electrical circuit 18 is utilized to compare the signals of the test photoelectric cell 14 and the reference photoelectric cell 16 and amplify the signals or carry out whatever other operation is necessary to obtain the signal in a form suitable for providing an accurate measurement. Preferably, the signal is provided in a form suitable for operating a recording device such as recording device 21.

Referring again to FIGURE 1, it is seen that the circuit 18 comprises a cathode follower 31 for the reference photoelectric cell, an amplifier 32 for the sample photoelectric cell, a gain control 33 for adjusting the input voltage to accommodate different signals resulting from the use of different bands of the spectrum in various determinations. For example, when the measurement is made in the green range, the signals tend to be comparatively strong and an amplification should therefore be weaker than in certain other ranges of the spectrum such as the ultraviolet range where the signals are weak. Generally, the circuit 18 also comprises a difference amplifier 34 which takes the signal from both the test photoelectric cell and the reference photoelectric cell and amplifies the ratio of said signals.

The signal from the difference amplifier may be used to activate any indicating device such as a meter if visual observation is desired, or it may be utilized to activate a recording device. A suitable recording device is shown schematically in FIGURE 1. As there shown, the signal is first passed through the circuit means 19 which comprises logarithmic attenuators 36 and 37, with attenuator 36 having an attenuation of a factor of 10 greater than attenuator 37. These logarithmic attenuators are designed so that either one or the other is in operation, depending upon the setting of range selector 38.

The logarithmic attenuators are electrically connected through potentiometers in the recording device 21, with logarithmic attenuator 36 being attached to a potentiometer 39 and logarithmic attenuator 37 being attached to a potentiometer 41. The recording device 21 also comprises a servomotor 42 which drives a three digit counter through shaft 43 to provide a three digit value in window 44 for visual reading and activate a printout on chart 46 to provide a permanent record.

The servomotor 42 also drives the potentiometers 39 and 41 which are adjusted to correspond to the value shown by shaft 43 so that when the signal is equivalent to the value shown on the chart device, a null balance is achieved. When the null balance is achieved, the servomotor 42 stops, and when the signal is out of balance the motor 42 drives in either forward or reverse direction toward the null point until this position is achieved.

Control for the servomotor 42 is provided by the servo amplifier 47 which obtains a signal from the difference amplifier and operates a 60 cycle line 48 through relays 49 to the servomotor 42. Printing of the chart for permanent recording is effected by print motor 51 operating through relays 49 on receipt of a readout signal. This readout signal is given when the test sample and reference samples are in place as will be more fully explained hereinafter.

In the embodiment illustrated in FIGURE 1, the servomotor and associated system operates on 60 cycles while the light in the spectrophotometer is attenuated at say 85 to 90 cycles. This helps avoid trouble caused in the amplifier working at low frequency signals from the photoelectric cells due to 60-cycle hum from the AC line.

While I have described the general operation of the typical circuit that may be used, it should be understood that many systems could be utilized. The important factor is that matched amplified outputs are compared by a difference amplifier or the like and the ratio of the intensity of the two light beams is determined. Different gain and phase inversion may be required in the two channels depending upon the splitting ratio of the beams and the type of comparator circuit used.

Figure 3:
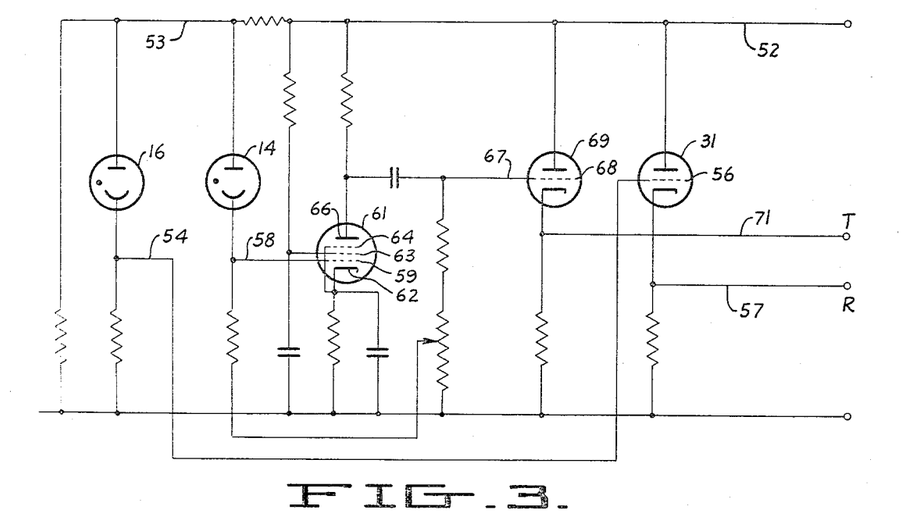
FIGURE 3, a detailed view illustrating an alternative circuit that may be used in the embodiment of FIGURE 1.

A circuit that has been proposed for use in the setup illustrated in FIGURE 1 is shown in FIGURE 3, in which a direct current line 52 having 250 volts is utilized for the amplifiers and cathode followers. Line 52 also provides a 90-volt direct current in supply line 53 which supplies current to the photoelectric cells 14 and 16.

Thus the reference photoelectric cell 16 is activated by the light beam directed through the reference sample to provide a signal in line 54. This signal is impressed on the grid 56 of cathode follower 31 to provide the reference signal in line 57 shown at R.

In similar fashion, the photoelectric cell 14 is activated by the light beam passing through the test sample with the cell being activated according to the intensity of this light beam to provide a signal in line 58. This signal is directed to the control grid 59 of tube 61 in the amplifier system. Tube 61 is a typical vacuum tube having a cathode 62, screen grid 63, suppressor grid 64 and plate 66.

The circuit is also equipped with various resistances and condensers as shown in the drawing so that a test signal of from 1 to 10 millivolts in line 58 leading to control grid 59 provides an inverted signal of from 10 to 100 millivolts in line 67. This line leads to the control grid 68 of the cathode follower 69 which in turn provides the test signal in line 71 at T. With this arrangement, the test signal and reference signal can be compared as explained above and recorded, if desired.

Figure 2:
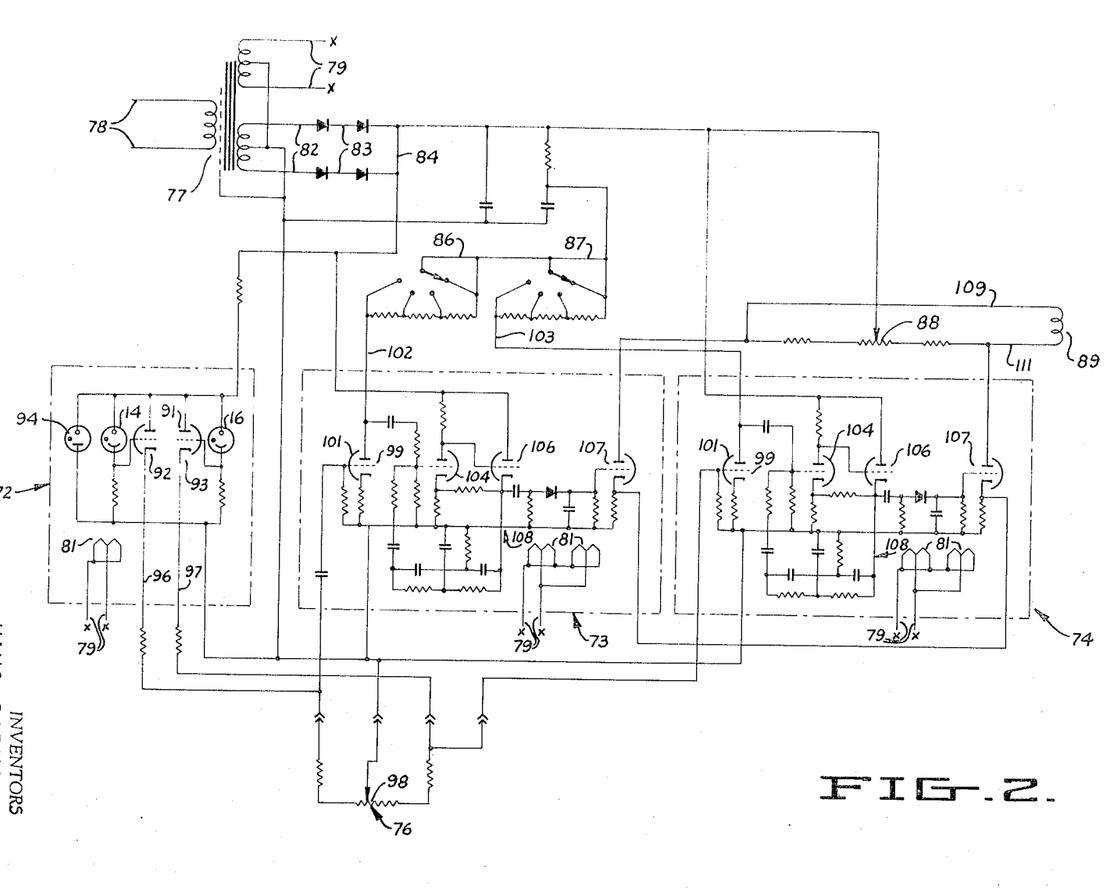
FIGURE 2, a detailed view of an electrical circuit that may be used in the embodiment of FIGURE 1.

A preferred circuit for handling a test signal and a reference signal is shown in FIGURE 2, which comprises a photoelectric tube module 72, an amplifier module 73 for amplifying the test signal, an amplifier module 74 for amplifying the reference signal, and a potentiometer 76 which is preferably adjusted to provide a null balance between the amplified test signal and the amplified reference signal. However, it will be appreciated that other methods of utilizing the potentiometer may be employed.

The circuit also includes other components such as a transformer 77 adapted to operate on a standard 60 cycle 110 volt supply line 78 to provide a 6.3 volt supply line 79 for operating the filaments 81 of the various vacuum tubes and a 0–250-volt supply line 82, rectifier system 83 for providing a direct current supply in line 84, variable gain controls 86 and 87 for adjusting the input voltage to the test amplifier module 73 and the reference amplifier module 74 respectively, a calibrating potentiometer 88, and a null balance meter 89.

This electrical system is suitable for providing a number of different possible visual indications of the analytical results sought or for use in combination with a number of recording systems for making a permanent record of the analytical result obtained. Thus the potentiometer 76 may carry an appropriate scale for reading the results directly or it may have means associated therewith for making a record of the result indicated by the position of the potentiometer.

A circuit may be applied to the system shown in FIGURE 1 which utilizes a servomotor to drive the potentiometer with the servomotor operated by the difference signal at the null meter 89. The potentiometer may be constructed as a logarithmic potentiometer, if desired, because the sample concentration affects the light intensity according to Beer's law; that is, the change is not linear, but, in the application herein used, it is inversely proportional to the concentration of the sample. However, for certain systems linear potentiometers may be used depending upon the area of measurement and the recording system utilized.

Calibration may be provided by a calibrating potentiometer 88 or by adjusting the light beam to either the test photoelectric cell or reference photoelectric cell as more fully explained hereinafter. This calibration is achieved by supplying both the test sample holder and the reference sample holder with reference material and adjusting in the machine to provide a zero reading. Thus, when the calibrating potentiometer 88 is utilized it is positioned to provide the zero reading when the reference samples are provided in both positions. Alternatively, when a light control rod is utilized, the calibration is achieved by adjusting the control rod until the zero position is achieved.

Thus it is seen that we have provided a dual system which is extremely accurate because a comparison is utilized, and many of the variable factors which could influence the results are cancelled out by being present in the same amount for both systems. The calibration is also valuable in providing exact matching of the two systems so that highly accurate results may be obtained for the desired colorimetric measurements.

The matched gain controls 86 and 87 are important in this dual system because of the signal strength can be adjusted to provide a sufficiently strong signal where the initial signal is weak such as in the ultraviolet areas of the spectrum and yet provide for measurement in an area such as the green area where the signal is strong. As here shown, the gain controls are a pattern of resistance systems in which a plurality of control points are provided to adjust the voltage of the supply line to the first stage of the amplifier. The important consideration is that the resistances are matched so that the output voltage in each line is the same. That is, the output voltage in the line to the test amplifier is the same as that in the line leading to the reference amplifier.

The phototube module 72 comprises a test photoelectric cell 14, a reference photoelectric cell 16, a dual system vacuum tube 91 providing cathode followers 92 and 93 for the test photoelectric cell and the reference photoelectric cell respectively, and a gas vacuum tube 94 serving as a voltage regulator for the supply line to the photoelectric tubes. With this arrangement, the test signal is provided in line 96 and the reference signal is provided in line 97.

The outputs of lines 96 and 97 are controlled by the potentiometers 76 so that the outputs may be matched according to the adjustments of the resistor 98 of potentiometer 76. These outputs are then compared or opposed so that their difference as shown by null meters 89 can be zeroed by adjusting the potentiometer. In order to provide an accurate positioning of the potentiometer, the signals in line 96 and 97 are amplified by the amplifier modules 73 and 74. An important feature of this invention resides in the fact that the amplifier modules 73 and 74 and their associated gain controls 86 and 87 are matched units operating from the same power source. The specific design of the amplifier modules is not critical provided the units are matched and have a sufficient capacity to provide accurate measurements.

Typical amplifier modules that may be used are shown in FIGURE 2. As there shown, both modules are similar and each contain a plurality of amplifier tubes and a suitable filter circuit. Thus the signals in line 96 and line 97 control the grids 99 of the amplifier tubes 101 with the power supply to the tubes 101 being lines 102 and 103 from gain controls 86 and 87. The signal from the first stage amplifier tubes 101 are then fed on through amplifiers 104, 106 and 107 utilizing the circuits shown in the drawings in which filter circuit 108 is incorporated for filtering out any stray frequencies. Thus the final output of the test amplifier module is directed to null meter 89 through line 109 while the signal from the reference amplifier module 74 is directed to null meter 89 through line 111.

Figure 4:
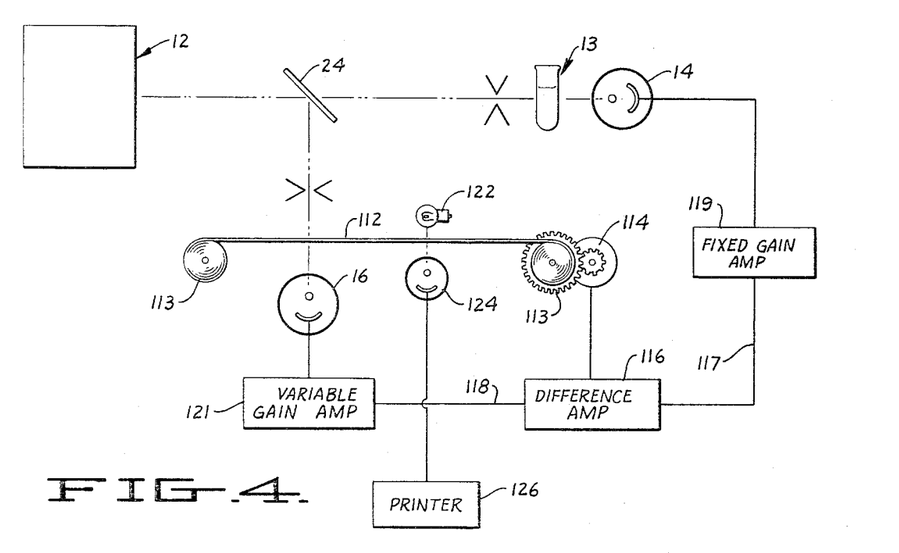
FIGURE 4, a schematic showing of an alternative form of the embodiment of FIGURE 1.

Other systems for comparing the test signal and the reference signal and measuring the ratio thereof may be provided if desired. For example, the embodiment of FIGURE 4 illustrates a method where the signals are balanced by optical compensation through a special optical tape which is accurately constructed to provide a varying scale of opacity from substantially complete transparency to substantially complete opacity. This tape is placed in the light beam which reaches the test photoelectric cell and is then adjusted until the light reaching the test photoelectric cell is the same as the light reaching the reference photoelectric cell. In this way, the measurement is translated to the position of the optical tape necessary to provide this matched optical property. The position of the tape may be noted visually or it may be driven by a recording mechanism to provide a permanent record.

Figure 5:
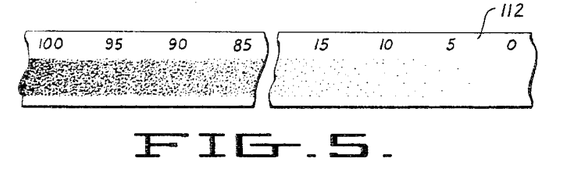
FIGURE 5, a plan view of a special optical tape that may be utilized in the embodiment of FIGURE 3.

Referring more particularly to FIGURES 4 and 5, there is shown a system in which a measurement is made by the optical tape 112 which varies in opacity as indicated by the numerals shown thereon, see FIGURE 5. The modulated monochromatic light provided in spectophotometer 12 is split by beam splitter 24 with one beam passing through the sample container or cuvette 13 to activate the test photoelectric cell 14 while the other beam passes through the optical tape 112 to the reference photoelectric cell 16. Preferably, a cuvette reference container is also provided so that the reference light beams pass therethrough as will be explained more fully hereinafter. However, it will be appreciated that in its broad aspect the invention may be an apparatus which does not contain a reference sample container.

The tape 112 is carried by reels 113 or the like with the reels being driven by a servomotor 114. The servomotor drives the tape according to the signals received from a difference amplifier 116 until the signal in the difference amplifier is at the zero point. In other words, the servomotor 114 will drive the tape in either forward or reverse direction to seek the zero point from the difference amplifier. This difference amplifier 116 has an output signal which is the difference between the input signal in line 117 and line 118 which line receives amplified signals from the test photoelectric cell 114 and reference photoelectric cell 116.

The amplifier which amplifies the signal from the test photoelectric cell is labeled as fixed gain amplifier 119 since the signal for any given sample will remain constant in measurement. The amplifier which amplifies the signal from reference photoelectric cell 116 is labeled as variable gain amplifier 121 because this amplifier amplifies the signal which is varied according to the position of the optical tape.

The important feature is that the amplifier 119 and the amplifier 121 are similarly constructed and operate from a common power supply as described above in the circuit for FIGURE 2. It is also important that the tape be properly calibrated so that accurate results are obtained according to the tape position. Calibration may be made, if desired, by utilizing a series of known samples to standardize the setup.

As indicated above, the optical tape may be read visually or a recording device may be utilized. For example, a recording device such as that described in connection with the embodiment of FIGURE 1 could be used where the servomotor not only drives the tape but also drives a suitable recording device. It is also possible to utilize a specially constructed tape 112 as shown in FIGURE 6, which uses the optical recording system shown in FIGURES 4 and 6.

This optical recording system comprises a series of light directing coding systems on the tape, a light source, and a light receiving mechanism which is activated according to the code systems. Thus, the recording elements of the embodiment of FIGURES 4 and 6 comprise an ordinary incandescent lamp 122, coded light units 123 on the tape, and a light receiving device 124. The light receiving device activates a printer 126 for providing a permanent recording.

Figure 6:
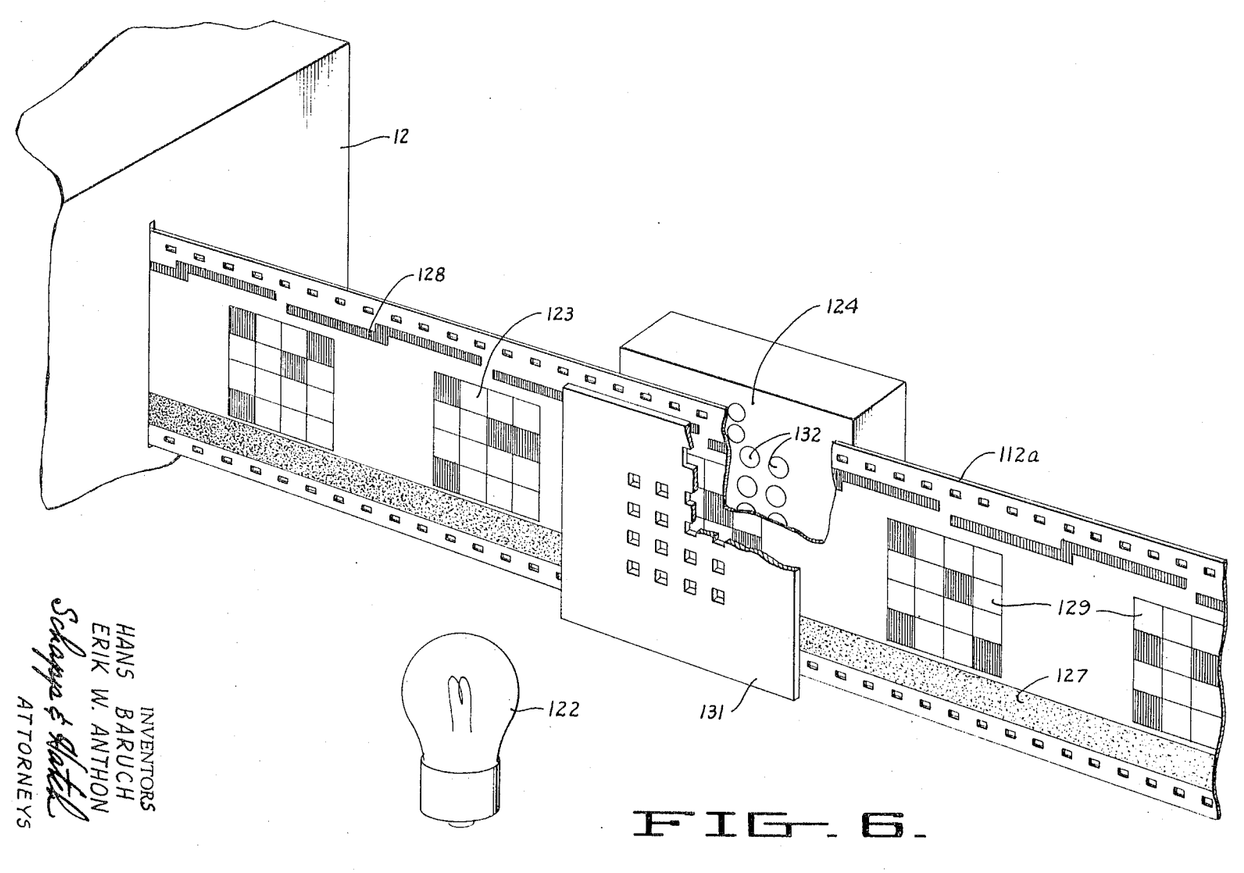
FIGURE 6, a perspective view illustrating still another optical tape and associated equipment that may be utilized in the embodiment of FIGURE 3.

A typical setup is shown in FIGURE 6, in which the optical tape 112 contains a strip of varying optical opacity 127 which positions the tape in the spectrophotometric apparatus 12 as explained above, a series of locator strips 128 for providing stepwise alignment of the tape in one of the series of positions corresponding to the nearest optical density, and a series of numeric code units 123 for translating the located condition corresponding to the answer into a numerical value. A shield 131 is also provided to prevent stray light from activating the code units and to direct rays of light through the various positions of the code units to the photosensing elements 132 of the light receiving device 124.

The photosensing elements 132 may be any of a number of means suitable for receiving the light pattern determined by the code units, and providing a signal to a printer for recording such answers. For example, the photosensing elements could be standard photosensitive resistors, photosensitive switches, photo transistors, a photo resistive matrix, or any other suitable system having the capabilities of these units.

In a typical example, the units 132 are utilized to activate relays attached to the key units of a standard adding machine. The operation of the numbered keys is determined by the code units. In this way, the printout signal simply activates the adding machine type mechanism to print the answer determined by the tape position. Of course, many other suitable systems could be utilized and the embodiments of FIGURES 4 through 6 have been included to illustrate the broad aspect of the invention.

From the foregoing description, it is seen that we have provided means for taking a signal from a photoelectric cell which provides a signal indicative of an analytical result, and a signal from a reference photoelectric cell used to provide accuracy in the test system for the colorimetric measurement. It is also seen that by providing matched components for both signals and comparing the two signals through electrical circuit means, we have provided a system which gives an accurate result that may be recorded on suitable recording devices, if desired.

A typical example of a spectrophotometric apparatus 12 which is used for carrying out the present invention is illustrated in FIGURES 7 and 8. This apparatus contains the preferred optical system for providing the desired monochromatic light and a preferred automated sample system in which a test sample and a reference sample are positioned and subjected to light to provide the signals mentioned above.

All of the components of the system are preferably mounted in a suitable housing 133 which is constructed to provide protection for the various components as well as mounting support therefor. Thus the photoelectric cells 14 and 16 are mounted in position on the housing 133 together with the other optical components and the cuvettes 13 and 134. The cuvettes are mounted in position on a block 136 and the preferred methods of mounting the cuvettes are shown in the copending application of Hans Baruch and Erik W. Anthon, the inventors in the present application, entitled Cuvette and Supply System Therefor, filed October 4, 1962, under Serial No. 228,337, now Patent No. 3,225,645 and assigned to the same assignee as the present application.

The beam splitter 24 is mounted in the block 136 and aligned for providing its reflected light through a slit 137 and thence through the cuvette 134 and liquid held therein to the photoelectric cell 16. The unreflected light or light transmitted directly through the beam splitter 24 passes through slit 183, sample liquid in cuvette 13 and thence to the photoelectric cell 14.

Light source 22 is mounted so as to provide a point source of light from an incandescent element. This light is reflected by a mirror 139, passes through chopper disc 17 and lens 141 to reach a diffraction grating 142. The lens 141 is preferably located between the chopper and the grating and serves to focus the point source light from the lamp 22 to substantially parallel light between the lens and the grating and then focus the return light back to a point at the exit slits 137 and 138.

The return beam is offset from the initial beam so that the light going from the grating returns through the lens 141 and the chopper disc 117 but misses the mirror 139. This alignment is achieved by the proper adjustment of the mirror 139 and the grating.

The diffraction grating is of conventional construction and mounted for rotation in the housing by means of lever 143. This grating determines the wave length of the monochromatic light or specifically the band of wave lengths of the monochromatic light returned back through the chopper, the beam splitter, and through the samples. Generally, the grating is manually adjusted by conventional means (not shown) since a given adjusted wave length is generally utilized for a plurality of determinations.

The chopper disc is mounted for rotation and suitably driven by the synchronous motor 28 to provide the modulated frequency desired for the signals provided by the photoelectric cells. With this arrangement, any modulated frequency may be obtained.

While the grating, lens, and chopper disc are standard construction, it is believed that the use of the beam splitter and matched systems for measuring the sample against a reference is a novel and valuable feature in instruments of this type. The use of the same light source which has been processed in the same way for both the sample to be measured and for the test sample provides extremely accurate results such as those desired for colorimetric analytical determinations.

Figure 9:
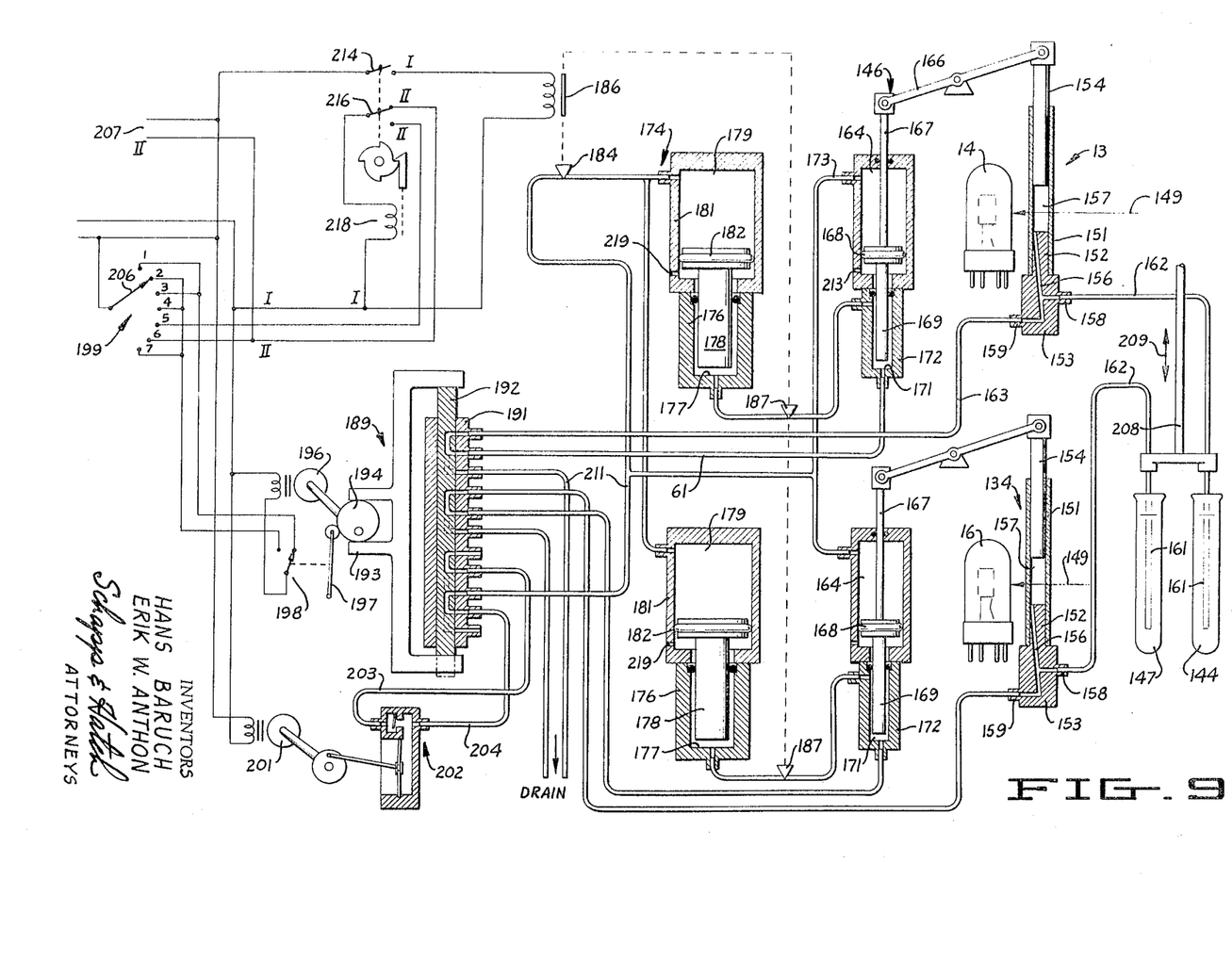
FIGURE 9, a schematic showing of a complete dual system for loading the spectrophotometer with sample to be determined, and for loading the spectrophotometer with a blank sample so that a comparison of the optical densities can be made.

Another feature of the invention resides in the completely automated system in which the sample is supplied in position for the determination together with means for activating the readout system described above. The automated supply system for the colorimeter is the subject of the copending application cited above and fully described therein. However, certain parts of the description of this improved system are included herein to illustrate the novel combination of the automated supply system and the automated measuring and recording device of this invention. A typical system is illustrated in FIGURE 9 which comprises the cuvette 13, a sample site 144 and a pump system 146 for moving sample from the sample site into the cuvette and for removing sample from the cuvette. In addition, the system shown also comprises a cuvette 134 adapted to receive blank sample from a blank sample container 147 and a pump system 148 for moving blank sample into and out of the cuvette 134. Thus a dual system is shown with the cuvette 13 being similar to the cuvette 134 and the pump system 146 being similar to the pump system 148. Accordingly, the description given below for the cuvette 13 and the pump system 146 is also applicable to cuvette 134 and pump system 148 and the similar parts of the two systems are similarly numbered.

In the systems shown, the cuvette 13 and the cuvette 134 are both carried in the spectrophotometric apparatus 12 in position to have monochromatic light pass through their contents as indicated by arrows 149 and impinge on the photoelectric cells 14 and 16.

As here shown, the cuvettes 13 and 134 each comprise a cylindrical housing 151 made of precision bore glass tubing, a bottom plug 152 which fits into an adapter 153, and a plunger 154. The bottom plug is preferably made of Teflon and has a top surface that has been chamfered eccentrically to provide a sharp angle between the walls of the cuvette and the bottom plug. In order to bring liquid into and out of the cuvette through the bottom plug 152, a passage 156 is located therein, and the passage has its upper end in communication with a chamber 157 defined by the housing 151 at the lowest point of the housing or at the lowest part of the eccentrically chamfered bottom 152. It has been found that this chamfered bottom allows almost complete draining of the liquid from the cuvette since the last drop will seek the sharpest corner between the sides and the bottom, and be drawn into the passage by capillary action.

Adapter 153 has two side arms 158 and 159 with arm 158 in communication with a probe 161 through a line 162, and arm 159 in communication with a fluid line 163. Line 163 is used to carry away liquid from the cuvette, and also to clear the probe and sample tube.

The fluid line 162 connecting the probe and the cuvette is smooth without joints or irregularities that may cause holdup of liquid and cross-contamination between samples. The use of valves in line 162 is also avoided for the same reason.

The plunger 154 is constructed to slide sealingly within the housing 151, and has an end constructed to match the bottom plug 152. In this way, the plunger acts as a pump that draws liquid into and expels liquid out of the chamber 157. The fit is also tight enough that the plunger keeps the walls of the glass tube clean and removes any film that might otherwise collect thereon.

The plunger is moved up and down by an air cylinder 164 through a rocker arm 166 which is connected to a piston arm 167 of a piston 168 carried in the air cylinder. A plunger 169 is also attached to the piston 168, and this plunger fits into a chamber 171 defined by a housing 172. The chamber 171 and the pump means for changing its volume will be referred to hereinafter as small scavenging cylinder 173. It is seen from FIGURE 9 of the drawings that air cylinder 146 simultaneously operates the small scavenging cylinder and plunger 154. With this operation, the small scavenging cylinder takes in liquid while the cuvette is emptied of its contents, and while the cuvette takes in liquid the small scavenging cylinder expels liquid. This operation is important because the small scavenging cylinder prevents the cuvette from emptying its contents back through the probe 161. In order to achieve this result, the small scavenging cylinder should be constructed to draw in a larger amount of liquid than is discharged by the cuvette.

In order to clear the system of excess sample liquid, a large scavenging cylinder 174 is provided. This cylinder is similar in construction to the small scavenging cylinder and operates by air pressure. Thus the large scavenging cylinder comprises a housing 176 enclosing a chamber 177 in which a plunger 178 reciprocates to create a difference in the volume of chamber 177. This reciprocation is provided by an air cylinder 179 comprising a housing 181 having a piston 182 which is attached to plunger 178 and mounted for axial reciprocation.

Air pressure or vacuum is supplied to the air cylinder 179 through a line 183 which is controlled by a valve 184 operated by a solenoid 186. This valve 184 is provided because a large scavenging cylinder only operates at the end of a cycle of operation to remove excess sample from the system. Similarly, a valve 187 is provided in line 188 extending between the large and small scavenging cylinders, and this valve is also controlled by solenoid 186. Accordingly, the valves 184 and 187 are normally closed and the liquid in the large scavenging cylinder does not effect the flow of liquid in other parts of the system. Instead, flow of fluids in the remainder of the system is effected by valve 189.

In general, valve 189 may be any valve capable of providing the desired changes in the fluid lines connected thereto, and the size of the valve will vary somewhat on the system utilized. As here shown, valve 189 comprises a cylindrical valve unit 191 having passages therein adapted to align with passages in a valve member 192 sliding within the cylindrical valve unit 191.

Valve member 192 is positioned to provide the communication of liquid lines and air lines as shown or to provide the communication shown in phantom. Adjustment of the positions is obtained by reciprocating motion of valve member 192 which in turn is moved by a frame 193. Frame 193 is moved by an eccentric 194 driven by motor 196 at half revolutions. These half revolutions are provided by action of a cam 197 which shuts off a switch 198 by positioning it to its other contact. At the other contact, the switch is in position to provide current to the motor for the next half revolution and be positioned back again. In this way, each time the motor 196 receives an electrical impulse from a master control system 199, the valve is positioned in the opposite direction and the pumps operate to provide the fluid flow required at the time.

As indicated above, any valve capable of achieving the desired result may be used, provided it gives the desired number of fluid line positions, and may be programmed automatically to carry out the pumping steps required. These pumping steps include transfer of sample into the cuvette, removal of the sample from the cuvette, and cleaning of the cuvette. A preferred valve and mechanism for operating the same is described and claimed in the copending United States application Ser. No. 183,506, filed Mar. 29, 1962, now Patent No. 3,199,538, entitled Valve by Erik W. Anthon, and assigned to the assignee of the present application.

As here shown, the system is controlled electrically, and line current is supplied through lines I and II when the apparatus is turned on. Thus it is seen that current is continuously supplied to a motor 201 which drives an air compressor 202 to provide air pressure and vacuum to the system through pressure line 203 and suction line 204. The other operations are controlled in seven steps by the seven positions in the master control system. As here shown, the master control system comprises a step switch or switch arm 206 adapted to control the connection with line II through any one of the seven circuits shown. In this way, the sample is moved into position, and the spectrophotometer readout is activated by supplying an impulse to line 207 at the proper timed sequence.

This impulse operates the recording mechanism discussed above for the various embodiments of the spectrophotometer. With the test sample and the reference sample in position, the other components of the spectrophotometer operate automatically.

In operation, the last step of a complete cycle is the drawing up of all excess sample into the large scavenging cylinder, which also draws air into lines 162, 163 and 164. The probes 161 are constructed of a material having a hydrophobic surface and therefore are substantially free of sample material after the large scavenging cylinder draws the material therethrough. However, if desired, the probes 161 may be moved to a wash site and then to the next sample for pumping sample material into the cuvette.

Any suitable transfer device may be used such as a device moving frame 208 which carries the probes in a reciprocating motion as indicated by arrow 209, while the containers are moved by independent conveying means (not shown). Examples of typical devices capable of effecting the desired transfer of the probe may be found in the copending patent application of Erik W. Anthon, Serial No. 61,206 entitled Materials Handling Apparatus, filed October 7, 1960, now Patent No. 3,178,266; the copending application of Hans Baruch, an inventor of the present invention, and Dalny Travaglio, Serial No. 207,123 filed July 2, 1962, now Patent No. 3,193,359, entitled Apparatus for Conducting Analytical Procedural Steps, and assigned to the same assignee as the present application; and the copending application of Hans Baruch, an inventor of the present invention, and Dalny Travaglio, Serial No. 207,121 filed July 2, 1962, now Patent No. 3,192,968 entitled Apparatus for Performing Analytical Procedures, and assigned to the same assignee as the present application.

With the probe 161 in place, switch arm 206 is moved to the position of contact No. 1 to drive motor 196 and cause valve 189 to assume the position with the passages as shown in phantom. With this valve position, pressure line 203 is in communication with air line 211 to pressurize the chamber above piston 168 and cause it to move downwardly. Piston 182 is unaffected because valve 184 in line 183 is closed. As piston 168 moves downwardly, liquid is expelled from the small scavenging cylinder through liquid line 188 to drain line 212. In this way, liquid line 190 is cleared of air. At the same time, plunger 154 of cuvette 13 moves upward to bring sample into probe tube 161. With these operations completed, switch arm 206 moves to position 2.

At position 2, the valve 189 moves to the position shown with air line 211 in communication with the vacuum or suction line 204 of the compressor so that a reduced pressure is provided in chamber 164 of the small scavenging cylinder. In this position, atmosphere pressure which is available through vent 213 forces the piston 168 upwards and this movement also forces plunger 154 downwards. In this way, all air is cleared from the cuvette and this is drawn through line 163 into chamber 171 of the small scavenging cylinder as plunger 169 moves upward. It is important to provide a larger change in volume in the small scavenging cylinder than in the cuvette so that liquid does not return back through the probe. However, it is seen that a small amount of such return would not be harmful because the liquid in the probe is sample just drawn.

After sufficient time has been allowed for the operation to be completed, the arm 206 is moved to position 3 by the master timer or control system 199 and the valve 189 moves back so that the passages shown in phantom are again in communication with the fluid lines as shown. At position 3, sample is drawn into the cuvette and the small scavenging cylinder is emptied to lines 190 and 211. However, the small scavenging cylinder is connected to drain line 212 and line 163 is shut off so that fresh sample is drawn up into the probe and into the cuvette 13. This material is used to clean out the cuvette and wash away any trace contaminants that might be present from prior samples. Accordingly, the timer 199 moves the switch arm to position 4 and the valve 189 moves back to the position shown in solid lines so that the small scavenging cylinder again draws in the liquid from the cuvette.

The timer then moves the switch to position 5 where the cuvette is refilled while the small scavenging cylinder discharges its contents to the drain as before. The switch is then moved to position 6, but at this position no change is made in the position of valve 189 so that the small scavenging cylinder remains drained and the line 211 is still connected to the valve pressure side of air compressor 202. However, at position 6 the solenoid 186 is activated to open valves 184 and 187 in the line leading to the large scavenging cylinder. This causes air cylinder 179 to be pressurized so that piston 182 and plunger 178 move downward to empty chamber 177 through line 188 and line 190 which is connected to the drain. At the same time the readout circuit is activated through line 207 so that a measurement is made by the spectrophotometer or other device associated with the system of this invention. Control of the circuitry to the solenoid 186 and the line 207 is effected by switches 214 and 216 which are operated by ratchet 217 through solenoid 218.

Since the test sample and reference sample have been in position in the cuvettes for a controlled time period, the photoelectric cells in the spectrophotometer have been giving signals to indicate the sample for a time sufficient for the servomotors or other automatic equipment to place the recording device in the proper print position. Thus the printout signal activates the mechanism during the desired controlled time period.

After the sample has been thus measured, the switch arm 206 moves to position No. 7 where valve 189 is moved to the reverse position and the large and small scavenging cylinders are operative through the vacuum in line 204. Thus atmospheric pressure enters air cylinder 179 through vent 219 and the large scavenging cylinder operates to remove all sample from the sample site through probe 161. This is accomplished by providing a larger volume change in the large scavenging cylinder than the volume of sample likely to be carried during the procedure. In this way, the probe is also cleared of sample by having air drawn therein. At the same time, the cuvette is draining and all of the sample is forced out of the cuvette. In other words, all of the sample in the system is drawn into the large and small scavenging cylinders.

At this time, the probe is moved to position in the next sample and then the master control timer can be moved back to position 1 for repetition of the cycle as described above.

From the foregoing description, it is seen that I have provided a completely automated spectrophotometric apparatus which is capable of automatically moving a sample into position for measurement in a spectrophotometer, making the measurement, automatically recording the result, and removing the sample from the system. It is also seen that I have provided an instrument of this character which is accurate in operation by utilizing a dual system in which both a test sample and a reference sample are positioned in the spectrophotometer and measurements are made on both samples to provide especially good results in which certain sources of error have been eliminated.

We claim:

1. An automated spectrophotometric system for measuring an optical property in each of a number of samples, comprising means defining a test sample region, a test sample cuvette in the test sample region, a test sample site where test samples are provided, a first conduit means formed to provide fluid communication between the test sample site and the test sample cuvette, a first power operated pump means for moving test samples from the test sample site through the first conduit means to the test sample cuvette, a test photoelectric element, means defining a reference sample region, a reference sample cuvette in the reference sample region, a reference sample site where reference samples are provided, a second conduit means formed to provide fluid communication between the reference sample site and the reference sample cuvette, a second power operated pump means for moving reference samples from the reference sample site through the second conduit means to the reference sample cuvette, valve means operatively associated with the power supply to the pump means for controlling the operation of the first and second pump means, a reference photoelectric element, a light source providing light over a large range of the spectrum, a diffraction grating for providing light having its wave length restricted to a narrow band thereof, means for adjusting the position of the diffraction grating to provide a wave length of the band of light selected to any band in a major portion of the visible and invisible spectrum, means for directing said narrow band toward the photosensitive elements, means for interrupting said narrow band at an accurately controlled frequency, transparent mirror means for splitting said band of monochromatic light into two fractions of similar monochromatic light, a housing for supporting the test and reference sample regions and the test and reference photosensitive elements in position so that one fraction of said band of monochromatic light passes through the test sample region and impinges on the test photosensitive element while the other fraction of said band of monochromatic light passes through the reference sample region and impinges on the reference photosensitive element, a first electric circuit coupled to the test photoelectric element for providing a signal in response to the monochromatic light reaching the test photoelectric element, a second electric circuit coupled to the reference photoelectric element for providing a signal in response to the monochromatic light reaching the reference photoelectric element, a printer for recording a number indicative of the analytic result to be obtained, servo means coupled to the first and second circuit and constructed to adjust the printer to correspond with a comparison of the first and second electric circuit, and timed delay switch means for operating the valve means and for actuating the printer after a time delay sufficient for the printer to reach its printing position in response to the servo means.

2. The automated spectrophotometric system defined in claim 1 which also comprises a gain control for adjusting the circuits in accordance with the particular wave length band of light selected, and a calibrator carried in one of the electric circuits for adjusting the comparison mechanism when calibration is necessary.

3. An automated spectrophotometric system for measuring an optical property in each of a number of samples, comprising means defining a test sample region, a test sample cuvette in the test sample region, a test sample site where the test samples are provided, a first supply conduit formed to provide fluid communication between the test sample site and the test sample cuvette, a first waste conduit in communication with the test sample cuvette for removing sample therefrom, a first pump means for moving test samples from the test sample site through the first supply conduit to the test sample cuvette and for removing sample through the first waste conduit, a test photosensitive element, means defining a reference sample region, a reference sample cuvette in the reference sample region, a reference sample site where the refrence samples are provided, a second supply conduit formed to provide fluid communication between the reference sample site and the reference sample cuvette, a second waste conduit in communication with the reference sample cuvette for removing sample therefrom, a second pump means for moving reference samples from the reference sample site through the second supply conduit to the reference sample cuvette and for removing reference sample through the second waste conduit, fluid power supply lines for operating the first and second pump means, valve means in said power supply lines for simultaneously controlling the operation of the first and second pump means, a reference photosensitive element, means for providing monochromatic light, means for interrupting said monochromatic light at an accurately controlled frequency, means for splitting said monochromatic light into two fractions, a housing for supporting the test and reference sample regions and the test and reference photosensitive elements in position so that one fraction of said monochromatic light passes through the test sample region and impinges on the test photosensitive element while the other fraction of said monochromatic light passes through the reference samples region and impinges on the reference photosensitive element, an electric circuit for providing a signal from the test photosensitive element and a signal from the reference photosensitive element and comparing the signals so provided, and measuring means associated with said comparison circuit for providing a measurement of a constituent in the sample, said measuring means being synchronized with the operation of the valve means to provide a series of accurate analytical determinations.

4. An automated spectrophotometric system for measuring an optical property in each of a number of samples, comprising means defining a test sample region, a test sample cuvette in the test sample region, a test sample site where the test samples are provided, a first supply conduit formed to provide fluid communication between the test sample site and the test sample cuvette, a first waste conduit in communication with the test sample cuvette for removing sample therefrom, a first pump means for moving test samples from the test sample site through the first supply conduit to the test sample cuvette and for removing samples through the first waste conduit, a test photoelectric element, means defining a reference sample region, a reference sample cuvette in the reference sample region, a reference sample site where the reference samples are provided, a second supply conduit formed to provide fluid communication between the reference sample site and the reference sample cuvette, a second waste conduit in communication with the reference sample cuvette for removing sample therefrom, a second pump means for moving reference samples from the reference sample site through the second supply conduit to the reference sample cuvette and for removing reference sample through the second waste conduit, fluid power supply lines for operating the first and second pump means, valve means in said power supply line for simultaneously controlling the operation of the first and second pump means and the flow of test and reference sample through the conduits, a reference photoelectric element means for providing monochromatic light, transparent reflecting means for splitting said monochromatic light into two fractions, a housing for supporting the test and reference sample regions and the test and reference photoelectric elements in position so that one fraction of said monochromatic light passes through the test sample region and impinges on the test photoelectric element while the other fraction of said monochromatic light passes through the reference sample region and impinges on the reference photoelectric element, a first electric circuit coupled to the test photoelectric element for providing a signal in response to the monochromatic light reaching the test photoelectric element, a second electric circuit coupled to the reference photoelectric element for providing a signal in response to the monochromatic light reaching the reference photoelectric element, and measuring means coupled to said first and second circuits for obtaining a measurement of a constituent in the test sample based on a comparison of the first and second electric circuit, said measuring means being synchronized with the operation of the valve means to provide a series of accurate analytical determinations.

5. The automated spectrophotometric system defined in claim 4 which also comprises means for recording the measurement of the measured constituents in the samples.

6. The automated spectrophotometric system defined in claim 5, in which the measuring means includes a potentiometer operating in a circuit containing the first and second electric circuits for providing a comparison of signals in said first and second circuit, and a servo motor which drives the potentiometer to a position where the first and second circuits are balanced while simultaneously driving the recorder to the position where it records the measurement of the constituent in the sample being measured.

References Cited

UNITED STATES PATENTS

| | | | |
|---|---|---|---|
| 1,746,525 | 2/1930 | Darrah | 250—218 X |
| 1,996,233 | 4/1935 | Darrah | 250—218 X |
| 2,503,165 | 4/1950 | Meyer | 88—14 |
| 2,529,030 | 11/1950 | Latchum | 250—218 X |
| 2,656,845 | 10/1953 | Lindsay | 250—218 X |
| 2,694,335 | 11/1954 | Albright et al. | 88—14 |
| 2,742,631 | 4/1956 | Rajchman et al. | 250—71 |
| 2,856,811 | 10/1958 | Kaye | 250—218 X |
| 2,861,493 | 11/1958 | Landegren | 88—14 |
| 2,895,055 | 7/1959 | Crane et al. | 250—218 |
| 2,984,149 | 5/1961 | Herscher et al. | 88—14 |
| 3,030,192 | 4/1962 | Schneider et al. | 250—218 X |
| 3,045,122 | 7/1962 | Bearden et al. | 250—218 |

JEWELL H. PEDERSEN, *Primary Examiner.*

ARCHIE R. BORCHELT, RONALD L. WIBERT,
*Examiners.*

E. STRICKLAND, *Assistant Examiner.*

Dedication 3,364,811.—*Hans Baruch*, Berkeley, and *Erik W. Anthon*, Kensington, Calif. AUTOMATED SPECTROPHOTOMETRIC SYSTEM. Patent dated Jan. 23, 1968. Dedication filed Mar. 2, 1970, by the assignee, *American Optical Corporation.*

Hereby dedicates the remaining term of said patent to the Public.

[*Official Gazette July 7, 1970.*]